UNITED STATES PATENT OFFICE.

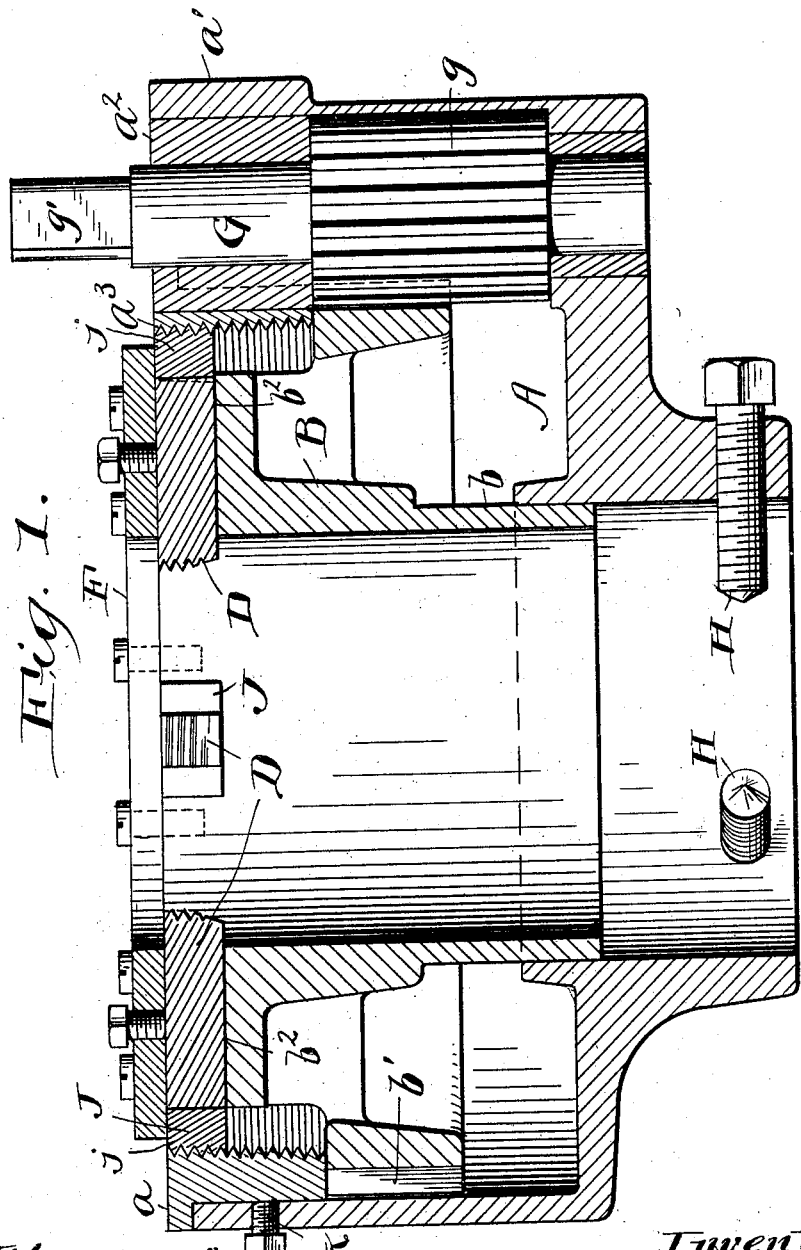

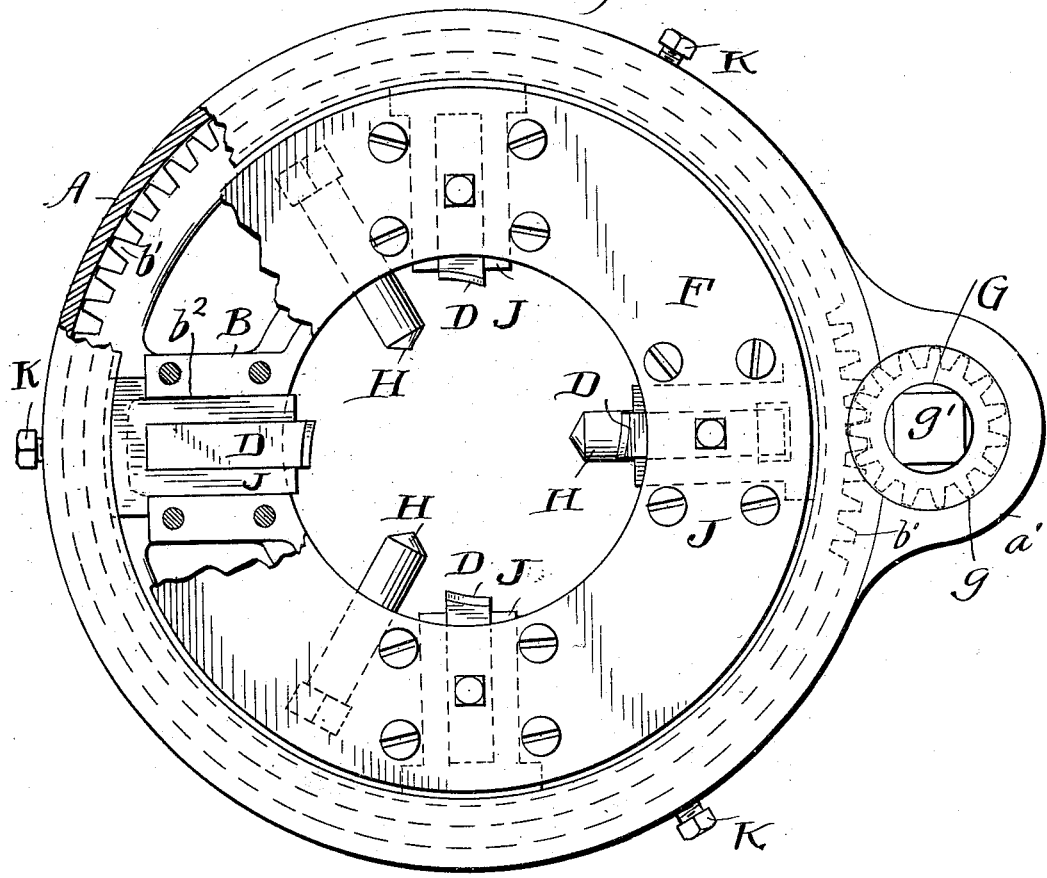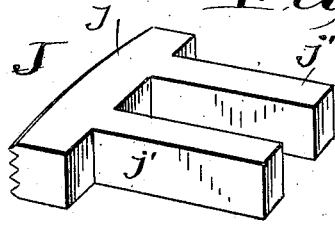

HERMAN W. OSTER, OF CLEVELAND, OHIO, ASSIGNOR TO THE OSTER MANUFACTURING COMPANY, OF CLEVELAND, OHIO, A CORPORATION OF OHIO.

DIE-STOCK.

No. 902,599.　　　Specification of Letters Patent.　　　Patented Nov. 3, 1908.

Application filed April 9, 1906. Serial No. 310,611.

*To all whom it may concern.*

Be it known that I, HERMAN W. OSTER, a citizen of the United States, residing at Cleveland, in the county of Cuyahoga and State of Ohio, have invented a certain new and useful Improvement in Die-Stocks, of which the following is a full, clear, and exact description.

The object of this invention is to provide mechanism wherewith to cut tapered threads upon pipes, tubing and the like,—and particularly on large sizes thereof,—by the application of comparatively little power. These results are attained by means of the combination of parts hereinafter described, and shown in the drawings, in which:—

Figure 1 is a central longitudinal section of a die stock embodying the invention. Fig. 2 is a plan view thereof with a portion of the cap plate broken away. Fig. 3 is a perspective view of one of the die cages; and Fig. 4 is a side elevation of a modified form of die.

Referring to the parts by letters, A represents the work-holding member or shell, which is of tubular form and is adapted to be secured upon the pipe to be threaded by means of set screws H, or any other suitable means. *a* represents an internally threaded sleeve, which is removably fastened into the upper end of the member A by set screws K or other suitable means. The screw threaded portion of this sleeve is tapered at the same angle which is required on the pipe to be threaded. The sleeve *a* is made independently of and secured rigidly to the sleeve A, because otherwise the parts, in the precise form shown, could not be assembled, and because it is possible to easily substitute another sleeve when the threads become worn or when it is desired to cut the pipe threads either straight or on a different taper. The sleeve *a* may, of course, be made integrally with the member A; and the other parts could be made of such form that they could be assembled as required.

B represents the die-carrying head, which is of tubular form, and is provided with a tubular extension *b*, which is rotatably fitted into the small bore of the shell, whereby said head is guided. This die-carrying head has, within the shell, an external gear *b'* which is in mesh with a long pinion *g* on a shaft G rotatably mounted in a boss *a'* on one side of the shell A.

In the outer end of the head B are radial guide-ways $b^2$ for the dies D, which dies are cut with a suitable lead. In the specific construction shown these guide-ways are of such size that they receive the cages J, in which the dies are removably fitted. The dies and the cages are held in said radial grooves by a cap plate F secured to the upper end of the head B and extending over said guide grooves.

Each of the cages J, as shown, consists of a head *j* and two parallel arms *j'*. The dies are fitted between said arms, and their rear ends abut against the head. The outer surface of the head is curved, tapered and screw threaded so as to fit the tapered internally threaded part of sleeve *a*. The use of the cage J is not essential, because the dies themselves might have their rear ends tapered and threaded, and might engage directly with the threaded part of the sleeve *a*. Such a die is shown in Fig. 4.

In use, the pipe to be threaded is passed through the tubular center of the shell and head substantially into engagement with the dies, and said pipe is fastened into the described tool by means of the set screws H. Then a key or handle (not shown) is applied to the squared projecting end *g'* of the shaft G, by means of which said shaft is turned. This, of course, results in the rotation of the head B relative to the shell A, and this rotation causes said head to move longitudinally within said shell. This combined rotary and advancing movement of the head causes the dies to cut a thread upon the pipe corresponding in pitch with the pitch of the threaded part of the sleeve *a*. Simultaneously the dies and their cages recede in accordance with the taper of the screw threaded interior of the sleeve *a*, and thereby the thread cut upon said pipe has not only a pitch corresponding with the pitch of the screw thread $a^3$ but has also a corresponding taper.

Having described my invention, I claim:

1. The combination of a work-holding member having a tapered and internally threaded portion, a die-carrying head rotatably mounted in said member and having radial guides for the dies, dies movable in said guides, tapered and threaded surfaces at the rear ends of said dies and movable with them and fitted to the internal threaded portion of the work holding member, and means for rotating the die-carrying head within the work holding member.

2. The combination of a work-holding member having a tapered and internally threaded portion, a die-carrying head rotatably mounted in said member and having radial guides for the dies, cages movable in said guides having tapered threaded outer ends in engagement with the threaded part of the work-holding member, dies in said cages, and mechanism for rotating the die-carrying head within the work-holding member.

In testimony whereof, I hereunto affix my signature in the presence of two witnesses.

HERMAN W. OSTER.

Witnesses:
E. B. GILCHRIST,
E. L. THURSTON.